United States Patent
Uemura et al.

(10) Patent No.: US 8,879,923 B2
(45) Date of Patent: Nov. 4, 2014

(54) OPTICAL TRANSMITTER/RECEIVER CIRCUIT DEVICE AND RECEIVER CIRCUIT

(75) Inventors: Hiroshi Uemura, Yokohama (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 13/603,780

(22) Filed: Sep. 5, 2012

(65) Prior Publication Data
US 2013/0163995 A1 Jun. 27, 2013

(30) Foreign Application Priority Data
Dec. 27, 2011 (JP) ................................. 2011-285477

(51) Int. Cl.
*H04B 10/00* (2013.01)

(52) U.S. Cl.
USPC ............................. 398/158; 398/141; 398/159

(58) Field of Classification Search
USPC ................. 398/140–142, 158–161, 182–214, 398/135–139
See application file for complete search history.

(56) References Cited

U.S. PATENT DOCUMENTS

| | | | |
|---|---|---|---|
| 6,362,910 B1 | 3/2002 | Tokita | |
| 6,381,054 B1 * | 4/2002 | Okayasu et al. | 398/140 |
| 6,763,060 B1 * | 7/2004 | Knapp | 375/219 |
| 6,891,408 B2 * | 5/2005 | Nishizono | 327/103 |
| 7,068,691 B2 * | 6/2006 | Chujo et al. | 372/38.02 |
| 7,167,491 B2 * | 1/2007 | Kim et al. | 372/29.01 |
| 7,764,885 B2 * | 7/2010 | Nguyen et al. | 398/135 |
| 8,705,979 B2 * | 4/2014 | Fujita | 398/182 |
| 2001/0043093 A1 * | 11/2001 | Sakura et al. | 327/108 |
| 2004/0075484 A1 * | 4/2004 | Nishizono et al. | 327/345 |
| 2005/0258885 A1 * | 11/2005 | Ono | 327/307 |
| 2006/0133814 A1 * | 6/2006 | Hayashi | 398/135 |
| 2010/0142976 A1 * | 6/2010 | Uemura et al. | 398/183 |
| 2010/0254713 A1 * | 10/2010 | Tanaka | 398/182 |
| 2011/0268454 A1 * | 11/2011 | Fujita | 398/135 |
| 2012/0235727 A1 * | 9/2012 | Oku et al. | 327/306 |
| 2013/0163995 A1 * | 6/2013 | Uemura et al. | 398/136 |
| 2013/0322886 A1 * | 12/2013 | Uemura | 398/135 |

FOREIGN PATENT DOCUMENTS

| | | |
|---|---|---|
| JP | 6-140994 | 5/1994 |
| JP | 6-177834 | 6/1994 |
| JP | 7-74788 | 3/1995 |
| JP | 2000-68946 | 3/2000 |

* cited by examiner

*Primary Examiner* — Agustin Bello
(74) *Attorney, Agent, or Firm* — Oblon, Spivak, McClelland, Maier & Neustadt, L.L.P.

(57) ABSTRACT

According to one embodiment, an optical transmitter/receiver circuit device includes a transmitter circuit including a transition time adjusting circuit to obtain a second voltage signal from a first voltage signal and a voltage-current converter circuit that converts the second voltage signal to a first current signal, a light-emitting element to convert the first current signal to an optical signal, a light-receiving element to convert the optical signal to a second current signal, and a receiver circuit including a current-voltage converter circuit that converts the second current signal to a third voltage signal, a pulse generation circuit to generate rise and fall pulse from the third voltage signal and a decoder circuit that generates a fourth voltage signal in synchronism with the pulse.

17 Claims, 11 Drawing Sheets

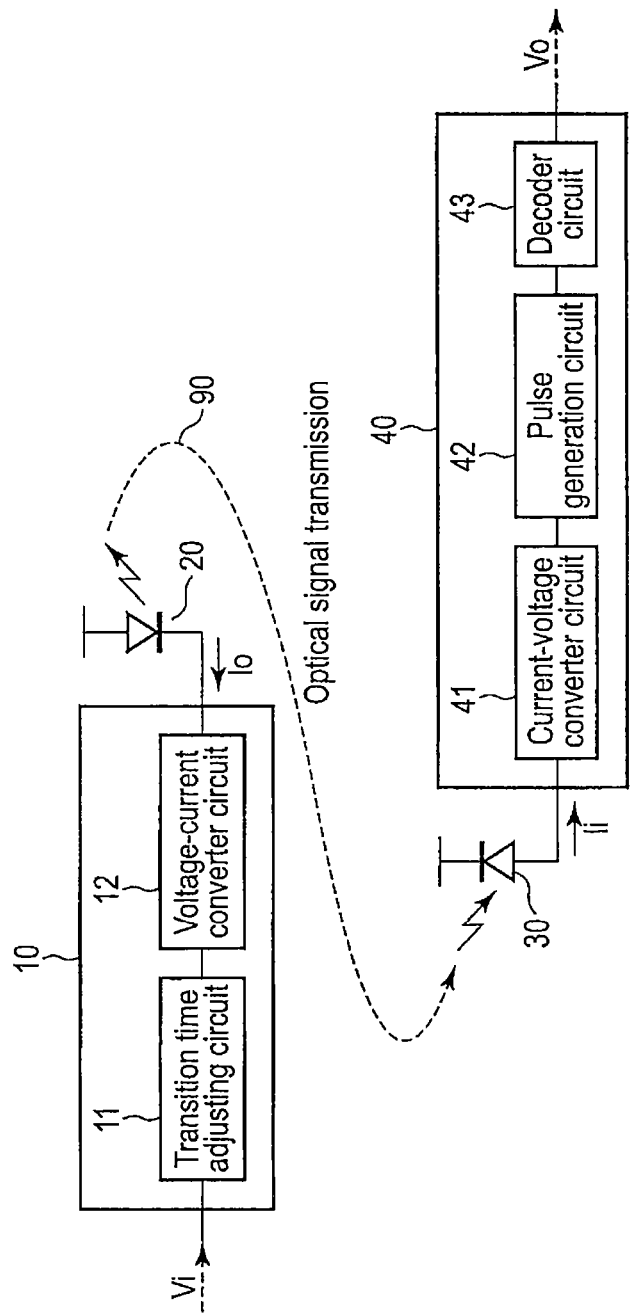
F I G. 1

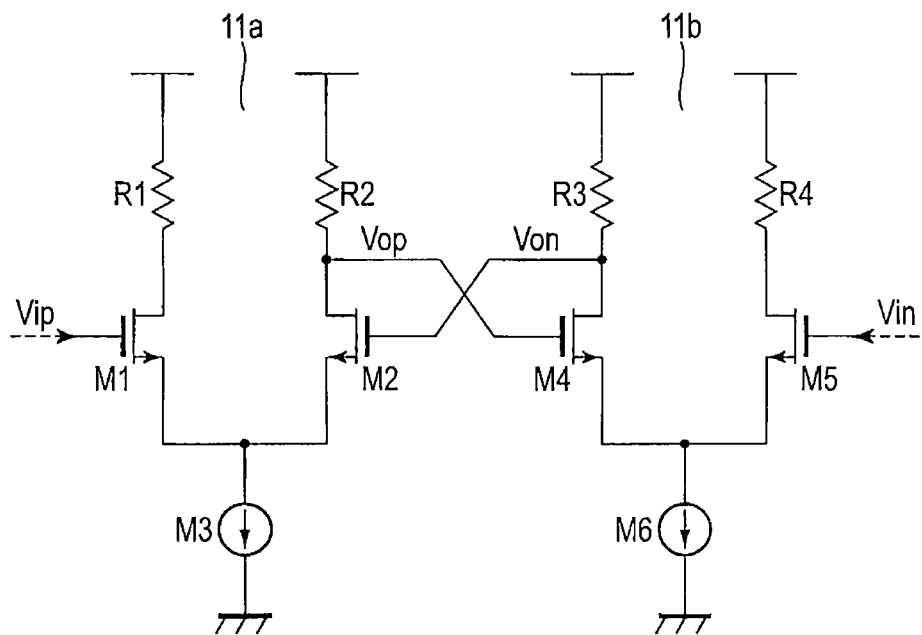
F I G. 2
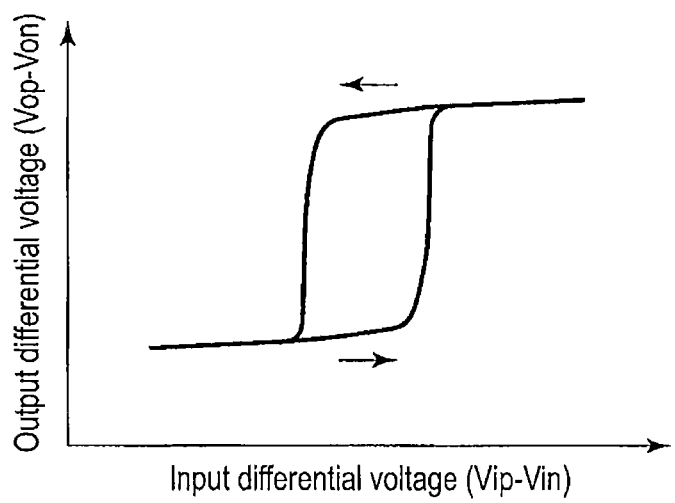
F I G. 3

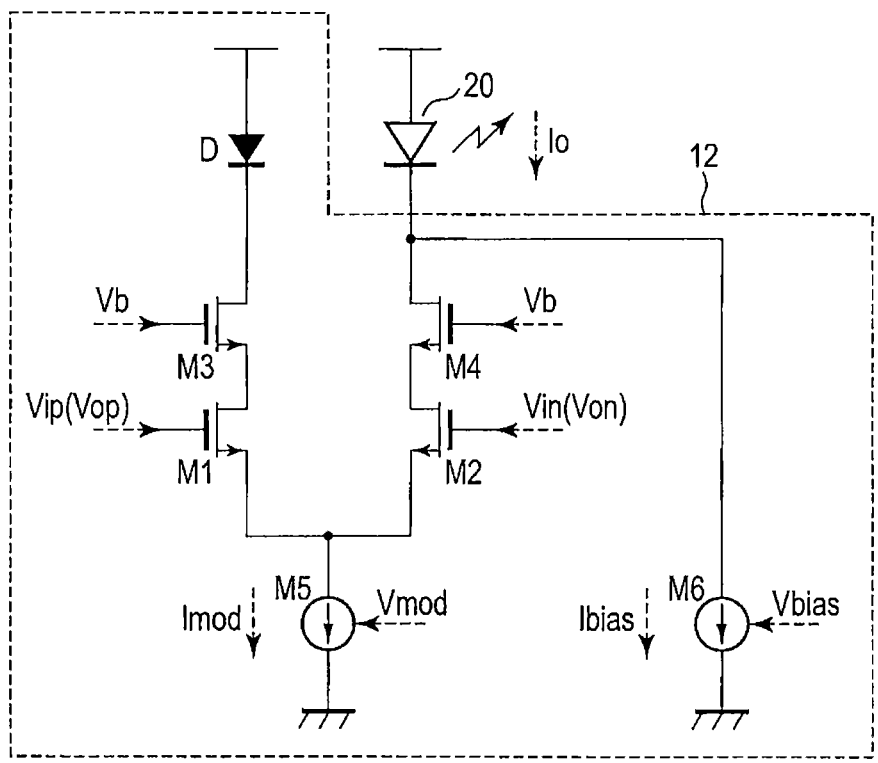
F I G. 4
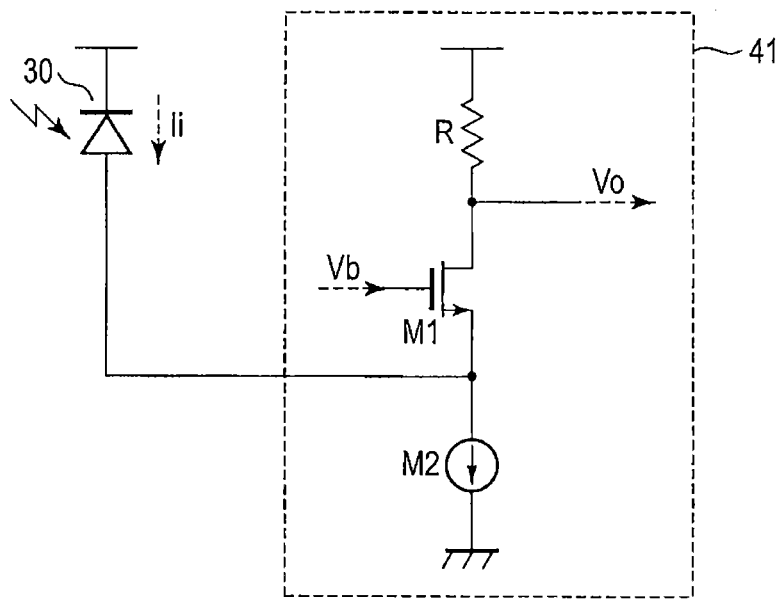
F I G. 5

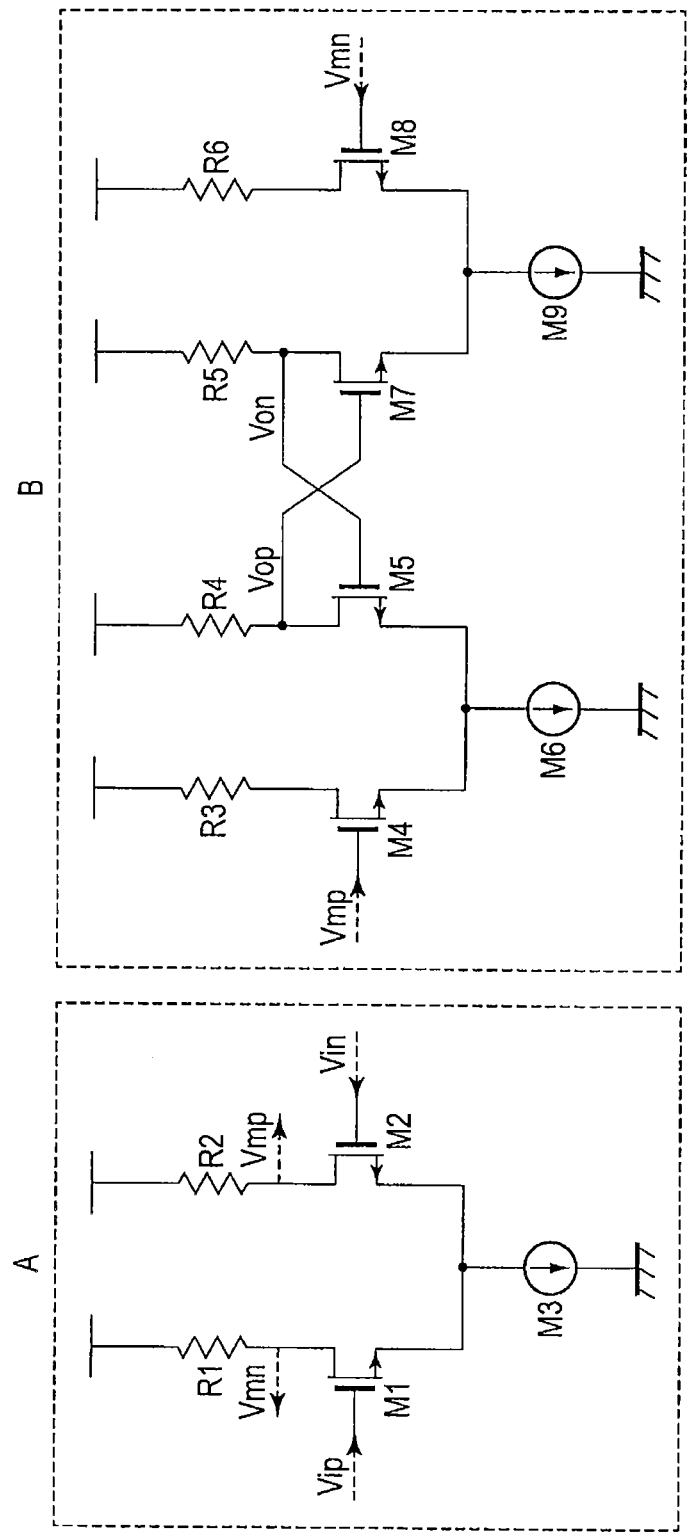
F I G. 8

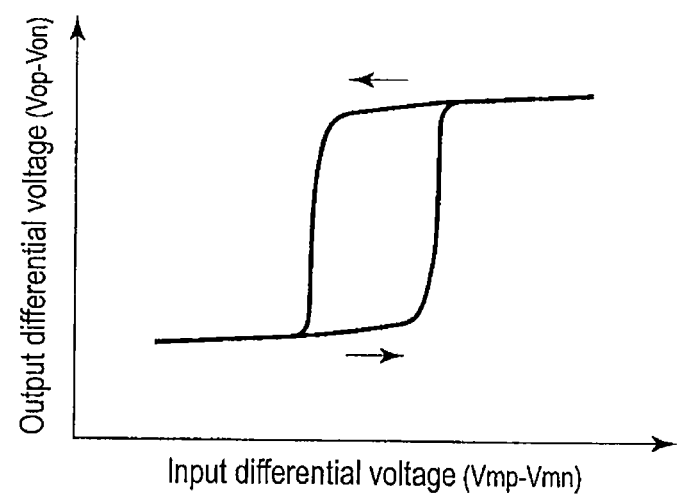
F I G. 9

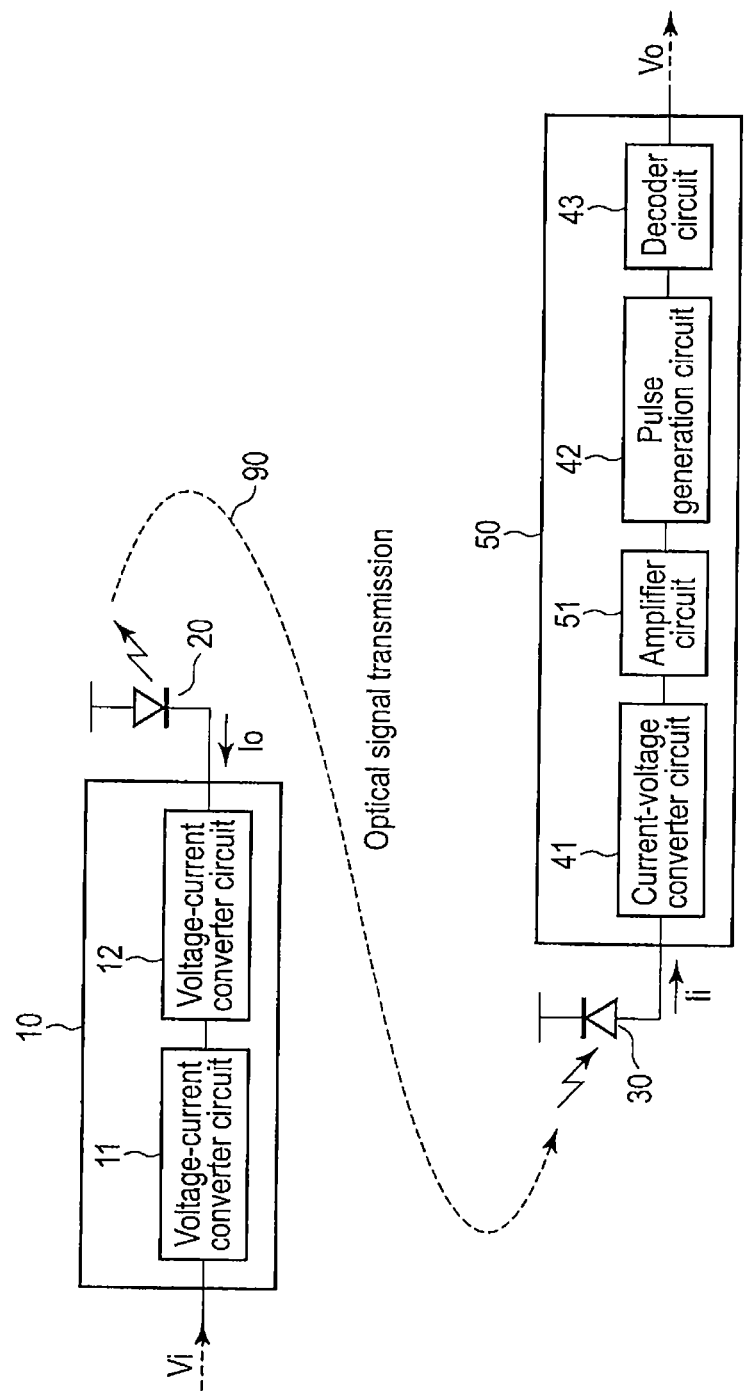
F I G. 10

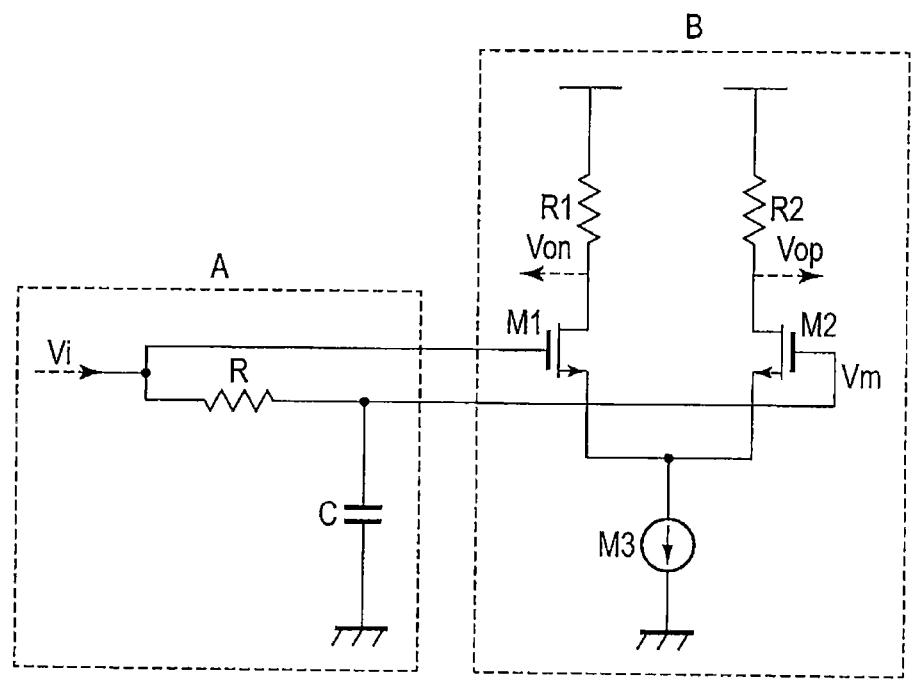
F I G. 11
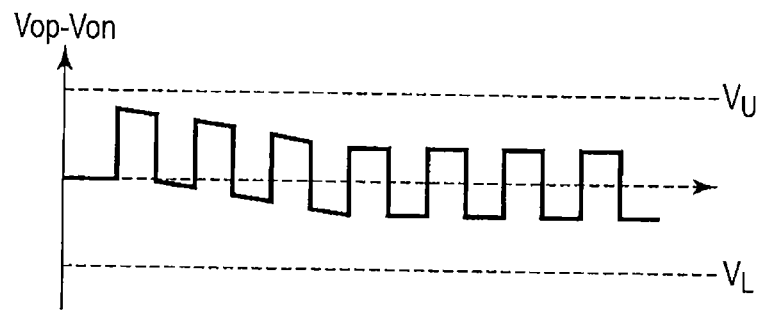
F I G. 12A
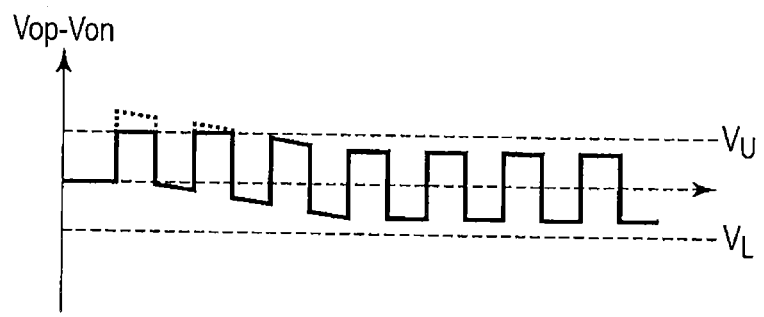
F I G. 12B

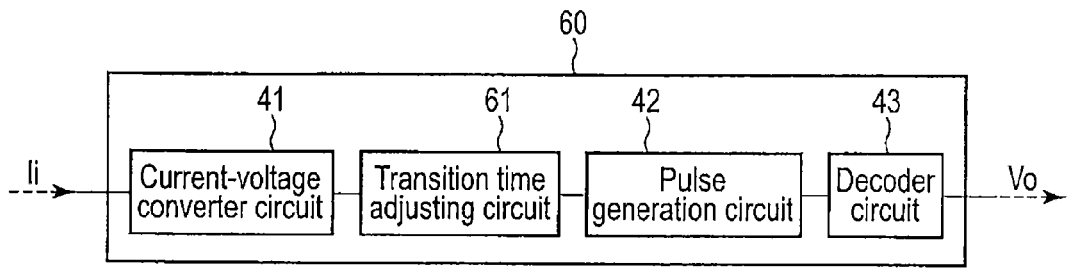
F I G. 13
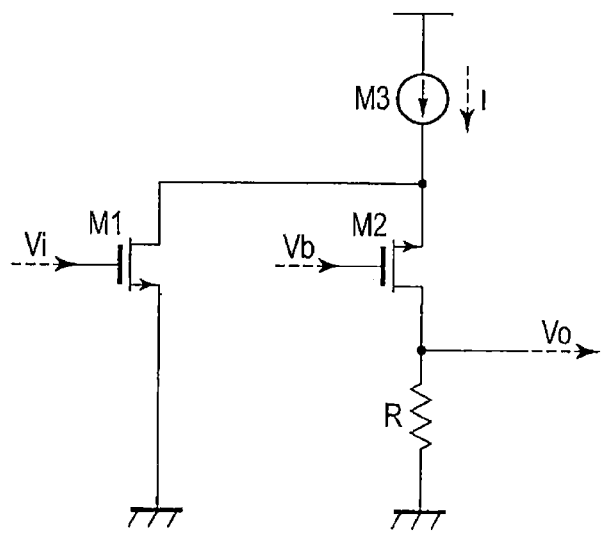
F I G. 14
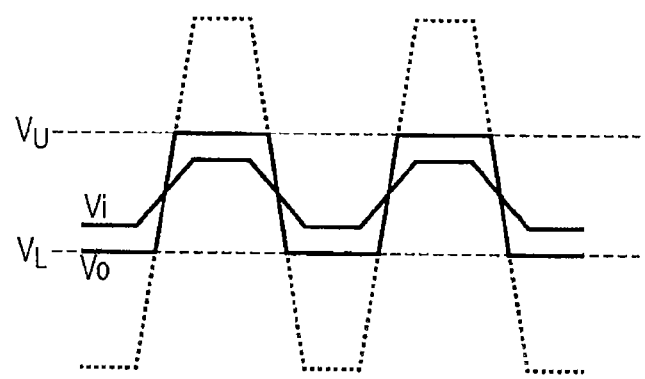
F I G. 15

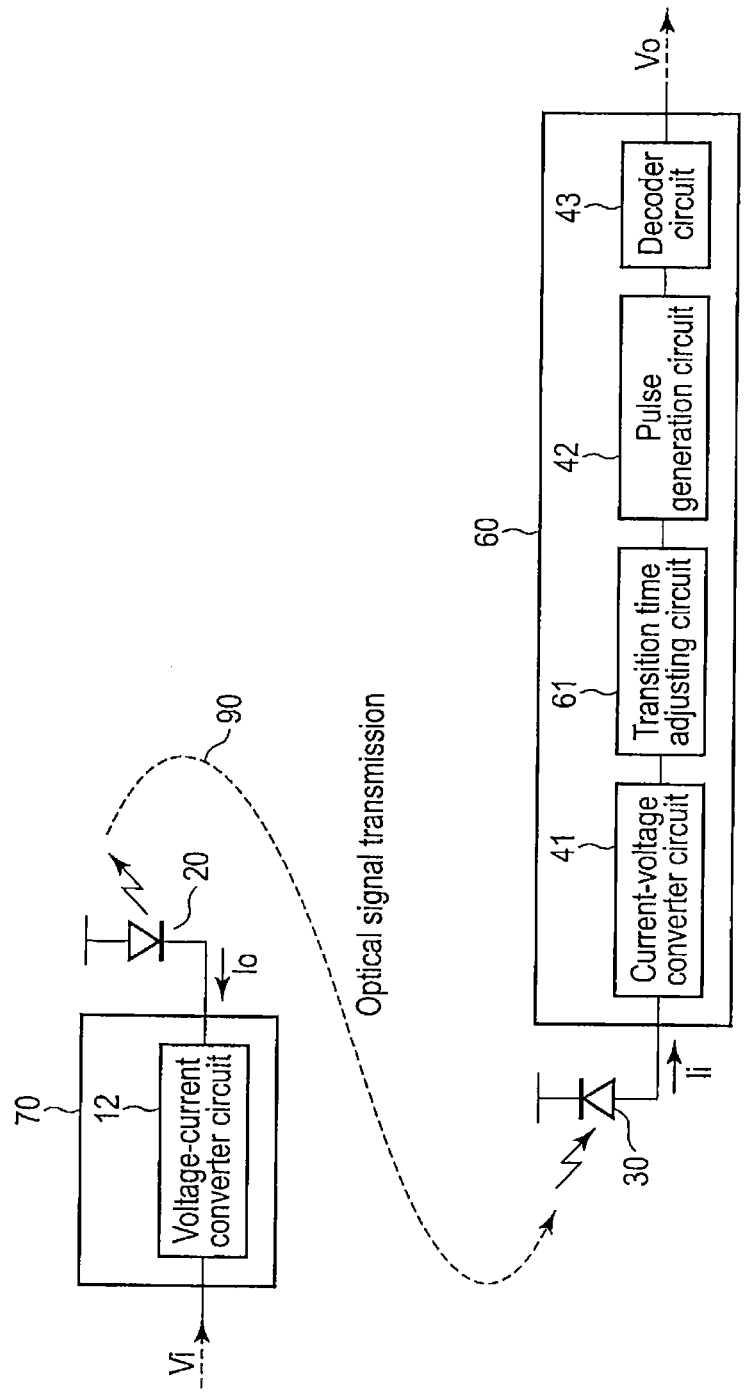
F I G. 16

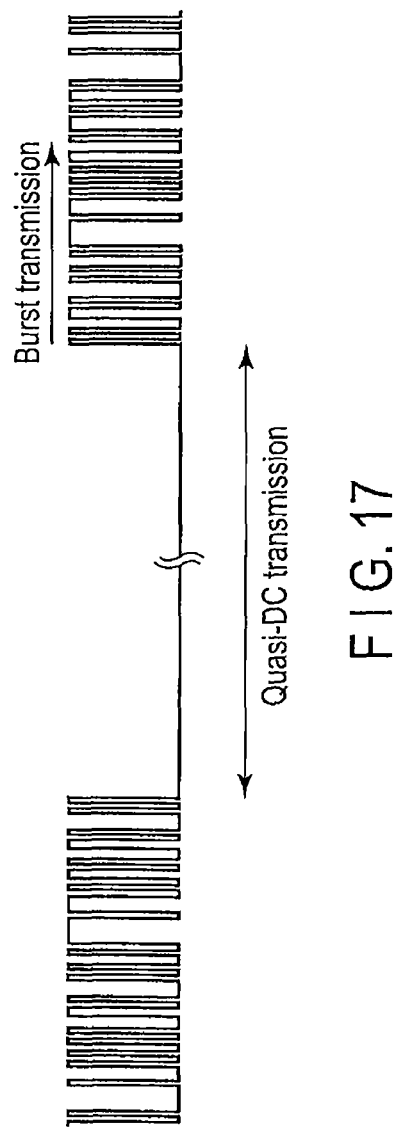
F I G. 17

OPTICAL TRANSMITTER/RECEIVER CIRCUIT DEVICE AND RECEIVER CIRCUIT

CROSS-REFERENCE TO RELATED APPLICATIONS

This application is based upon and claims the benefit of priority from Japanese Patent Application No. 2011-285477, filed Dec. 27, 2011, the entire contents of which are incorporated herein by reference.

FIELD

Embodiments described herein relate generally to an optical transmitter/receiver circuit device and a receiver circuit.

BACKGROUND

Recently, a signal processing amount in an information communication apparatus increases with enhancement of the performance of electronic devices and an increase in the volume of multimedia content. At the same time, the signal transmission rate in interconnections of such apparatuses increases and signal losses and electromagnetic noise interference related thereto become a problem. Therefore, much attention is being paid to optical signal transmission with high rate and low noise features and various optical transmitter/receiver circuit devices are proposed.

BRIEF DESCRIPTION OF THE DRAWINGS

FIG. 1 is a block diagram showing the schematic configuration of an optical transmitter/receiver circuit device according to a first embodiment.

FIG. 2 is a circuit configuration diagram showing one example of a transition time adjusting circuit used in a transmitter circuit of the optical transmitter/receiver circuit device of FIG. 1.

FIG. 3 is a diagram showing the operation waveform in the transition time adjusting circuit of FIG. 2.

FIG. 4 is a circuit configuration diagram showing one example of a voltage-current converter circuit used in the transmitter circuit of the optical transmitter/receiver circuit device of FIG. 1.

FIG. 5 is a circuit configuration diagram showing one example of a current-voltage converter circuit used in a receiver circuit of the optical transmitter/receiver circuit device of FIG. 1.

FIG. 8 is a circuit configuration diagram showing one example of a decoder circuit used in the receiver circuit of the optical transmitter/receiver circuit device of FIG. 1.

FIG. 9 is a diagram showing the operation waveform in the decoder circuit of FIG. 8.

FIG. 10 is a block diagram showing the schematic configuration of an optical transmitter/receiver circuit device according to a second embodiment.

FIG. 11 is a circuit configuration diagram showing one example of an amplifier circuit used in a receiver circuit of the optical transmitter/receiver circuit device of FIG. 10.

FIGS. 12A and 12B are diagrams showing the operation waveforms in the amplifier circuit of FIG. 11.

FIG. 13 is a block diagram showing the schematic configuration of a receiver circuit according to a third embodiment.

FIG. 14 is a circuit configuration diagram showing one example of a transition time adjusting circuit used in the receiver circuit of FIG. 13.

FIG. 15 is a diagram showing the operation waveform in the transition time adjusting circuit of FIG. 14.

FIG. 16 is a block diagram showing the schematic configuration of an optical transmitter/receiver circuit device according to a fourth embodiment.

FIG. 17 is a diagram showing quasi-DC transmission and burst transmission waveforms.

DETAILED DESCRIPTION

Figure 6:
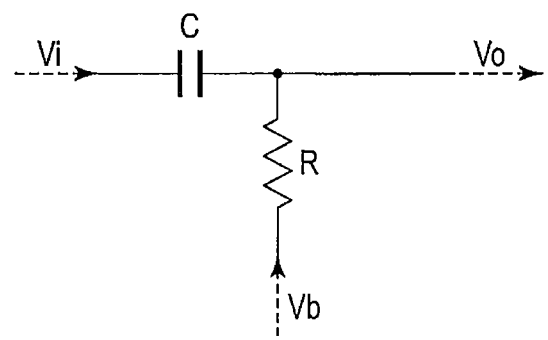
FIG. 6 is a circuit configuration diagram showing one example of a pulse generation circuit used in the receiver circuit of the optical transmitter/receiver circuit device of FIG. 1.

In general, according to one embodiment, there is provided an optical transmitter/receiver circuit device comprising:

a transmitter circuit configured to receive a voltage signal and output a current signal, the transmitter circuit including a transition time adjusting circuit that adjusts each of transition times of a rise and fall of a first voltage signal in a preset range to acquire a second voltage signal and a voltage-current converter circuit that converts the second voltage signal to a first current signal, a light-emitting element configured to convert the first current signal output from the transmitter circuit to an optical signal, an optical interconnection line that transmits the optical signal, a light-receiving element configured to convert the optical signal transmitted via the optical interconnection line to a second current signal, and a receiver circuit configured to receive a current signal and output a voltage signal, the receiver circuit including a current-voltage converter circuit that converts the second current signal to a third voltage signal, a pulse generation circuit configured to generate a rise pulse in synchronism with a rise of the third voltage signal and generate a fall pulse in synchronism with a fall of the third voltage signal and a decoder circuit that generates a fourth voltage signal that rises in synchronism with the rise pulse and falls in synchronism with the fall pulse.

The optical transmitter/receiver circuit device and receiver circuit according to this embodiment were invented by the inventor of this application and others to make it possible to perform quasi-DC transmission and burst transmission irrespective of the through rate of an input signal. As shown in FIG. 17, the quasi-DC transmission is signal transmission in which a low or high level of a NRZ (Non Return to Zero) signal is continuously maintained and can be regarded as signal transmission of an extremely low rate (for example, 1 kbps). Further, the burst transmission is signal transmission that is abruptly started in a no-signal state or quasi-DC transmission state.

As an optical receiver circuit capable of performing quasi-DC transmission and burst transmission, a system of processing edge pulses with substantially the same shapes generated only at a timing at which an input signal is transited is known. In this system, an input current signal is converted to a voltage signal by means of a preamplifier and pulses (edge pulses) that are synchronized with a rise and fall of the voltage signal are generated by means of a differentiating circuit. Then, after the pulse is amplified by means of a limiter amplifier, a voltage signal with the same logic as an input signal is restored by means of a hysteresis comparator. As a result, signal reception that does not depend on a bit pattern can be performed.

However, the inventor of this application and others found that the optical receiver circuit of this type has a problem in that it cannot be applied to an actual signal transmission system. That is, in the actual signal transmission system, the through rates (signal variation amounts per each unit time) of a rise and fall of a signal are changed in proportion to the transmission rate for the reason that noise radiation from the transmission line at the signal transition time is suppressed or the like. Therefore, an edge pulse may not be generated by means of the differentiating circuit with respect to a low-rate signal in some cases.

This is caused due to the following reason. That is, if an input voltage is Vi and an output voltage is Vo in a differentiating circuit formed of resistor R and capacitor C, the relationship of Vo=RC(dVi/dt) is obtained. In other words, output voltage Vo varies in proportion to the through rates (dVi/dt) of a rise and fall of input signal Vi. As one example, if the through rate of a rise and fall of a signal varies in proportion to the signal transmission rate, the edge pulse height of a low-rate signal of 10 kbps becomes 10 kbps/6 Gbps=1.67× $10^{-6}$ times the edge pulse height of a high-rate signal of 6 Gbps. In practice, the receiver circuit is operated with a power source voltage of several V at most. Therefore, even if the edge pulse height of a high-rate signal is set to the maximum value of the power source voltage, the edge pulse height of the low-rate signal is set in the order of µV and the signal is embedded in noise and cannot be restored.

The present embodiment is made with respect to the thus found problem to adjust the transition time of an input electrical signal in a preset range and then set the through rate of the electrical signal after adjustment in a constant range. As a result, it becomes possible to provide an optical transmitter/receiver circuit device and receiver circuit that make it possible to perform quasi-DC transmission and burst transmission irrespective of the through rate of the input electrical signal. Next, the embodiments are explained in detail below with reference to the drawings.

(First Embodiment)

FIG. 1 is a block diagram showing the schematic configuration of an optical transmitter/receiver circuit device according to a first embodiment.

The device includes a transmitter circuit 10 that converts input voltage signal Vi to current signal Io and outputs the resultant signal, a light-emitting element 20 such as a semiconductor laser that converts current signal Io output from the transmitter circuit 10 to an optical signal and outputs the resultant signal, an optical interconnection line 90 such as an optical fiber that transmits the optical signal, a light-receiving element 30 such as a photodiode that converts the optical signal transmitted via the optical interconnection line 90 to current signal Ii and outputs the resultant signal and a receiver circuit 40 that converts current signal Ii to voltage signal Vo and outputs the resultant signal.

The transmitter circuit 10 includes a transition time adjusting circuit 11 that adjusts transition times of a rise and fall of input voltage signal Vi (first voltage signal) in a preset range and outputs a signal and a voltage-current converter circuit 12 that converts an output signal (second voltage signal) of the transition time adjusting circuit 11 to current signal Io (first current signal) and outputs the thus obtained signal. Then, the transmitter circuit 10 supplies current signal Io to the light-emitting element 20.

The operation of adjusting the transition time into the preset range in the transition time adjusting circuit 11 means that the transition time is adjusted to set the through rate of an input signal on the receiver circuit side to a through rate permitted in the receiver circuit. More specifically, it is preferable to acquire a through rate that causes the amplitudes of a rise pulse and fall pulse generated from a pulse generation circuit 42 that will be described later to be sufficiently larger than the amplitude of noise (for example, ten times or more).

FIG. 2 is a circuit configuration diagram showing one example of the transition time adjusting circuit 11 used in the transmitter circuit 10. In FIGS. 2, R1 to R4 are resistor elements, M1, M2, M4, M5 are nMOS transistors, M3, M6 are current sources configured by nMOS transistors, Vip, Vin are input differential signals and Vop, Von are output differential signals.

The transition time adjusting circuit 11 of FIG. 2 is configured by a first differential amplifier circuit 11a and second differential amplifier circuit 11b. The first differential amplifier circuit 11a is configured by R1, R2, M1 to M3 to obtain non-inverted output Vop based on non-inverted input Vip and inverted input Von. The second differential amplifier circuit 11b is configured by R3, R4, M4 to M6 to obtain inverted output Von based on inverted input Vin and non-inverted output Vop.

Non-inverted output Vop of the first differential amplifier circuit 11a is positively fed back to the non-inverted input terminal of the second differential amplifier circuit 11b and inverted output Von of the second differential amplifier circuit 11b is positively fed back to the inverted input terminal of the first differential amplifier circuit 11a. Therefore, as shown in FIG. 3, if input differential voltage (Vip−Vin) exceeds a preset threshold value and increases/decreases, output differential voltage (Vop−Von) instantly increases/decreases until the output limits of the first and second differential amplifier circuits 11a and 11b are reached. Since the transition time at this time is substantially determined by the operation speed of the differential amplifier circuit 11, the through rate of an output electrical signal can be adjusted in a preset range irrespective of the through rate of an input electrical signal.

FIG. 4 (within broken lines) is a circuit configuration diagram showing one example of the voltage-current converter circuit 12 used in the transmitter circuit 10. In FIG. 4, D is a diode element, M1 to M4 are nMOS transistors, M5, M6 are current sources configured by nMOS transistors, and 20 is a light-emitting element such as a semiconductor laser. Vip, Vin are input differential signals, Vb is a DC voltage, Io is a current flowing in the light-emitting element 20, Imod is a current flowing in current source M5 and is a modulation current of the light-emitting element 20, Ibias is a current flowing in current source M6 and a bias current of the light-emitting element 20, Vmod is a DC voltage used for adjusting modulation current Imod, and Vbias is a DC voltage used for adjusting bias current Ibias.

Output Vop of the first differential amplifier circuit 11a of the transition time adjusting circuit 11 of FIG. 2 is input to the gate of M1 of FIG. 4 as input voltage Vip and output Von of the second differential amplifier circuit 11b of the transition time adjusting circuit 11 of FIG. 2 is input to the gate of M2 of FIG. 4 as input voltage Vin.

The voltage-current converter circuit 12 of FIG. 4 is a differential amplifier circuit. Therefore, when input differential voltage (Vip−Vin) is positive, current Io=Imod Ibias flows in the light-emitting element 20 and when input differential voltage (Vip−Vin) is negative, current Io=Ibias flows in the light-emitting element 20. The transition time of Io is substantially determined by the transition time of input differential voltage (Vip−Vin). Since the transition time of differential voltage (Vip−Vin) is adjusted in the preset range by the transition time adjusting circuit 11, the transition time of Io is set in a preset range.

For example, bias current Ibias is set in a range in which the voltage across the light-emitting element 20 is set higher than the rise voltage (on-voltage) of the diode and is set in a range less than the threshold current of laser oscillation. As a result, the differential resistance (that is, a load in the circuit) of the light-emitting element 20 can be made low by use of a small current and a high-speed signal response can be attained. Modulation current Imod is set in a range in which (Ibias+Imod) becomes larger than the threshold current of the light-emitting element 20.

The power source voltage of the voltage-current converter circuit 12 of FIG. 4 is set at 3.3 V, for example. This is because the rise voltage of the light-emitting element 20 is approximately 2 V in a case where a light-emitting element is formed of GaAs, for example. The withstand voltage of nMOS transistors M1 and M2 to which differential voltages are input is as low as 1.2 V, for example, because of the high-speed drive operation. Therefore, nMOS transistors M3, M4 with the withstand voltage of 3.3 V and gate voltage Vb of 1.2 V are connected to the drains of nMOS transistors M1, M2 and voltages applied to nMOS transistors M1, M2 are set to 1.2 V or less.

Diode element D is arranged to set the load of the differential amplifier circuit approximately equal to the light-emitting element 20. However, instead of this, for example, a resistor element or a parallel-connected circuit formed of a resistor element and capacitor element may be used.

Thus, by configuring the transmitter circuit 10 to include the transition time adjusting circuit 11 and voltage-current converter circuit 12, an output current signal having the through rate in a preset range is obtained irrespective of the through rate of the input voltage signal.

The receiver circuit 40 includes a current-voltage converter circuit 41 that converts current signal Ii (second current signal) output from the light-receiving element 30 to a voltage signal (third voltage signal) and outputs the thus obtained signal, a pulse generation circuit 42 that generates a rise pulse in synchronism with a rise of the voltage signal and generates a fall pulse in synchronism with a fall of the voltage signal, and a decoder circuit 43 that outputs a voltage signal (fourth voltage signal) that rises in synchronism with the rise pulse and falls in synchronism with the fall pulse.

The receiver circuit 40 processes edge pulses of substantially the same shape generated only at timings at which an input signal transits as will be described later. Therefore, signal reception irrespective of a bit pattern can be performed and quasi-DC transmission and burst transmission can be performed.

FIG. 5 (within broken lines) is a circuit configuration diagram showing one example of the current-voltage converter circuit 41 used in the receiver circuit 40. R is a resistor element, M1 is an nMOS transistor and M2 is a current source. Ii is an input current (output current of the light-receiving element 30), Vb is a DC voltage and Vo is an output voltage. The current-voltage converter circuit 41 of FIG. 5 is a grounded gate amplifier circuit (trans impedance amplifier). In the current-voltage converter circuit 41, output voltage Vo having the amplitude of R×Ii is obtained by use of the trans impedance gain substantially determined by R.

Figure 7:
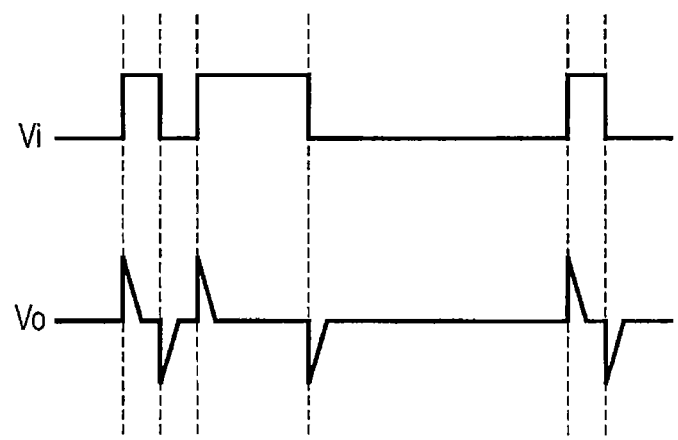
FIG. 7 is a diagram showing the operation waveform in the pulse generation circuit of FIG. 6.

FIG. 6 shows one example of the pulse generation circuit 42 and is a differentiating circuit configured by capacitor element C and resistor element R. In the differentiating circuit, as shown in FIG. 7, it is possible to generate a rise pulse at the rise time of input voltage Vi and generate a fall pulse at the fall time of input voltage Vi. Vb is a DC voltage and the DC voltage level of output voltage Vo can be set according to the magnitude of voltage Vb.

FIG. 8 shows one example of the decoder circuit 43 used in the receiver circuit 40. A is a single-phase differential converter circuit that converts a single-end signal to a differential signal and B is a decoder circuit configured to output a voltage signal that rises in synchronism with a rise pulse and falls in synchronism with a fall pulse.

In single-phase differential converter circuit A, an output of the pulse generation circuit 42 of FIG. 6 is set as non-inverted input Vip and DC voltage Vb of FIG. 6 is set as inverted input Vin. As a result, a non-inverted output obtained by amplifying input differential voltage (Vip−Vin) is obtained from Vmp, an inverted output thereof is obtained from Vmn and a single-end signal can be converted to a differential signal.

Decoder circuit B utilizes non-inverted output Vmp of single-phase differential converter circuit A as a non-inverted input and utilizes inverted output Vmn of single-phase differential converter circuit A as an inverted input. As shown in FIG. 9, in decoder circuit B, output differential voltage (Vop−Von) has hysteresis with respect to input differential voltage (Vmp−Vmn). Therefore, if a rise pulse of the differential signal output from single-phase differential converter circuit A is input, the differential signal output from decoder circuit B rises and if a fall pulse of the differential signal output from single-phase differential converter circuit A is input, the differential signal output from decoder circuit B falls. Then, the output value is maintained until a next fall (rise) pulse is input. Thus, decoder circuit B outputs a voltage signal that rises in synchronism with the rise pulse and falls in synchronism with the fall pulse.

As described above, according to this embodiment, an optical transmitter/receiver circuit device that can perform quasi-DC transmission and burst transmission irrespective of the through rate of an input electrical signal can be realized by using the transmitter circuit 10 that acquires an output current signal having the through rate in a preset range irrespective of the through rate of an input voltage signal and the receiver circuit 40 that can perform signal reception irrespective of a bit pattern.

As transmission means such as the optical interconnection line 90 configured to transmit an optical signal output from the light-emitting element 20 to the light-receiving element 30, an optical fiber or optical waveguide can be used. If an optical fiber is used, a guide part that optically couples the light-emitting element 20 or light-receiving element 30 with the optical fiber is used. In this case, it is possible to form an optical transmission module in which a guide part having the light-emitting element 20 mounted thereon and the transmitter circuit 10 are connected to one terminal of the optical fiber and a guide part having the light-receiving element 30 mounted thereon and the receiver circuit 40 are connected to the other terminal thereof. If an optical waveguide is used, it is possible to form an optical transmission module in which the optical waveguide with the laminate structure is formed in a film, the transmitter circuit 10 and light-emitting element 20 are mounted on one terminal thereof and the light-receiving element 30 and receiver circuit 40 are mounted on the other terminal thereof.

(Second Embodiment)

FIG. 10 is a block diagram showing the schematic configuration of an optical transmitter/receiver circuit device according to a second embodiment. Portions that are the same as those of FIG. 1 are indicated by the same symbols and the detailed explanation thereof is omitted.

This embodiment is different from the first embodiment explained before in that an amplifier circuit 51 is disposed between the current-voltage converter circuit 41 and the pulse generation circuit 42 in the receiver circuit 50. The remaining configuration of the receiver circuit 50 and the configurations of the transmitter circuit 10, light-emitting element 20 and light-receiving element 30 are the same as those of FIG. 1.

In the case of this embodiment, a third voltage signal obtained in the current-voltage converter circuit 41 is amplified by means of the amplifier circuit 51 and becomes a fourth voltage signal. Then, in the pulse generation circuit 42, pulses are generated in synchronism with the rise and fall of the fourth voltage signal and a decoder circuit 43 outputs a fifth voltage signal in synchronism with a pulse obtained in the pulse generation circuit 42.

FIG. 11 is a circuit configuration diagram showing one example of the amplifier circuit 51 used in the receiver circuit 50. In FIG. 11, A is an integrating circuit formed of resistor element R and capacitor element C and B is a differential amplifier circuit. Vi is an input single-end signal of integrating circuit A, Vm is an output single-end signal of integrating circuit A, and Vop, Von are output differential signals of differential amplifier circuit B. For example, integrating circuit A receives an output of the current-voltage converter circuit 41 shown in FIG. 5 as an input and outputs an integration waveform that is a time average value. Differential amplifier circuit B receives input Vi of integrating circuit A as a non-inverted input, receives output Vm of integrating circuit A as an inverted input and outputs differential voltage (Vop−Von) obtained by amplifying input differential voltage (Vi−Vm).

Since an output is a differential signal if the differential amplifier circuit of FIG. 11 is used, a pulse generation circuit including two differentiating circuits shown in FIG. 6 may be used; one of them may receive non-inverted output Vop as an input and the other one may receive inverted output Von as an input. Further, decoder circuit B shown in FIG. 8 may be used as the decoder circuit 43.

By thus providing the amplifier circuit 51, the amplitude of a voltage signal input to the pulse generation circuit 42 is increased and the rise pulse and fall pulse of the output thereof become large. Therefore, the operation range of the receiver circuit 50 associated with the input current can be enlarged and, at the same time, the decoding operation in the decoder circuit 43 becomes easy. As a result, the operation stability of the receiver circuit 50 is enhanced.

The operation of amplifying the rise pulse and fall pulse can be realized by arranging the amplifier circuit 51 at the succeeding stage of the pulse generation circuit 42. However, in this case, since the pulse widths of the rise pulse and fall pulse are narrower in comparison with those of the original signal, an amplifier circuit that is operated in a higher band becomes necessary. That is, as in this embodiment, an amplifier circuit that is operated in a lower band can be used by disposing the amplifier circuit 51 between the current-voltage converter circuit 41 and the pulse generation circuit 42. As a result, the power consumption of the amplifier circuit 51 can be suppressed and the design can be simplified.

In the burst transmission, output differential voltage (Vop−Von) of the differential amplifier circuit of FIG. 11 becomes a signal that is biased on the plus side or minus side as shown in FIG. 12A until an output of integrating circuit A is settled. However, it is desirable to set differential voltage (Vop−Von) in the range between output limits VU and VL of the differential amplifier circuit of FIG. 11 in the input current range of the receiver circuit 50.

This is caused due to the following reason. That is, as shown in FIG. 12B, since portions (dotted portions in FIG. 12B) that exceed the output limits are cut off when differential voltage (Vop−Von) is higher than output limit VU or lower than VL, the waveform is distorted. The transition amount and timing of the rise and fall have been changed in the above portions. Then, the rise pulse and fall pulse generated in the pulse generation circuit 42 become low, the pulses cannot be restored by means of the decoder circuit 43 and jitter will occur in the decoded signal. In order to avoid this, it is desirable to set differential voltage (Vop−Von) in the range of output limits VU and VL.

Thus, according to this embodiment, an increase in the operation range and enhancement of the operation stability of the optical transmitter/receiver circuit device that can perform quasi-DC transmission and burst transmission irrespective of the through rate of an input electrical signal can be achieved by arranging the amplifier circuit 51 between the current-voltage converter circuit 41 and the pulse generation circuit 42 in the receiver circuit 50 in addition to the configuration of the first embodiment.

(Third Embodiment)

FIG. 13 is a block diagram showing the schematic configuration of a receiver circuit according to a third embodiment. Portions that are the same as those of FIG. 1 are indicated by the same symbols and the detailed explanation thereof is omitted.

A receiver circuit 60 of this embodiment converts input current signal Ii to voltage signal Vo and outputs the thus obtained signal. The receiver circuit 60 includes a current-voltage converter circuit 41 that converts a current signal to a voltage signal, a transition time adjusting circuit 61 that adjusts the rise and fall transition times of an output voltage signal of the current-voltage converter circuit 41 and outputs a signal, a pulse generation circuit 42 that generates a rise pulse in synchronism with the rise of an output voltage signal of the transition time adjusting circuit 61 and generates a fall pulse in synchronism with the fall of the output voltage signal of the transition time adjusting circuit 61 and a decoder circuit 43 configured to output a voltage signal that rises in synchronism with the rise pulse and falls in synchronism with the fall pulse. An optical receiver circuit can be configured by connecting a light-receiving element (not shown) that converts an optical signal to a current signal to the receiver circuit 60.

The current-voltage converter circuit 41, pulse generation circuit 42 and decoder circuit 43 may have the same configurations as those explained in the first embodiment.

FIG. 14 is a circuit configuration diagram showing one example of the transition time adjusting circuit 61 used in the receiver circuit 60.

In the transition time adjusting circuit 61 of FIG. 14, R is a resistor element, M1 is an nMOS transistor, M2 is a pMOS transistor and M3 is a current source. Vi is an input voltage signal, Vb is a DC voltage and Vo is an output voltage signal.

As shown in FIG. 15, the transition time adjusting circuit 61 amplifies input signal Vi and outputs output signal Vo in a range between upper limit VU of an output limit and lower limit VL of the output limit. At this time, portions (dotted portion) that exceed the output limit are cut off. Therefore, the transition times of the rise and fall of output signal Vo can be made shorter in comparison with the transition times of the rise and fall of input signal. Vi. The minimum value of the transition time of output signal Vo is almost determined based on the operation speed of the circuit. Therefore, if a plurality of circuits of FIG. 14 are connected as the transition time adjusting circuit 61, the transition time of output signal Vo can be adjusted in a preset range irrespective of the transition time of input signal Vi. That is, the through rate of an input signal of the pulse generation circuit 43 can be set in a constant range irrespective of the through rate of an input signal of the receiver circuit 60. As a result, quasi-DC signal reception and burst signal reception can be performed irrespective of the through rate of an input electrical signal.

When input signal Vi is biased on the upper limit VU side of the output limit or on the lower limit VL side of the output limit, the amount that is cut off according to the output limit becomes different on the power source voltage side and ground side. Then, waveform distortion due to cross-point deviation or the like occurs. Therefore, it is desirable to set the DC voltage level of input signal Vi at substantially an intermediate level between upper limit VU of the output limit and lower limit VL of the output limit by additionally providing a circuit that adjusts the output DC voltage level of the current-voltage converter circuit 41 or optimizing the circuit parameter.

Thus, according to this embodiment, the receiver circuit that can perform quasi-DC signal reception and burst signal reception irrespective of the through rate of an input electrical signal can be realized by introducing the transition time adjusting circuit 61 in the receiver circuit 60.

(Fourth Embodiment)

FIG. 16 is a block diagram showing the schematic configuration of an optical transmitter/receiver circuit device according to a fourth embodiment. Portions that are the same as those of FIG. 1 and FIG. 13 are indicated by the same symbols and the detailed explanation thereof is omitted.

In this embodiment, as the receiver circuit 60, the receiver circuit (FIG. 13) of the third embodiment is used. A transmitter circuit 70 does not necessarily include a transition time adjusting circuit or the like and is sufficient if a voltage-current converter circuit 12 is provided therein and thus a general transmitter circuit can be used. Further, the configurations and operations of a light-emitting element 20, optical interconnection line 90, light-receiving element 30 and the like are the same as those of the first embodiment.

With the above configuration, an optical transmitter/receiver circuit device that can perform quasi-DC transmission and burst transmission irrespective of the through rate of an electrical signal input to the receiver circuit 60 can be realized. In this case, unlike the second and third embodiments, since the transmitter circuit 70 can be configured by use of a general transmitter circuit without causing any problem, the transmitter circuit 70 can be easily designed.

(Modification)

This invention is not limited to the above embodiments described above.

The specific circuit configuration of the transition time adjusting circuit in the transmitter circuit is not limited to the configuration shown in FIG. 2 and is sufficient if the transition times of the rise and fall of an input signal can be adjusted in a preset range. Likewise, the specific circuit configuration of the transition time adjusting circuit in the receiver circuit is not limited to the configuration shown in FIG. 14 and is sufficient if the transition times of the rise and fall of an output signal of the current-voltage converter circuit can be adjusted in a preset range.

Further, the specific circuit configurations of the voltage-current converter circuit used in the transmitter circuit and the current-voltage converter circuit, pulse generation circuit, decoder circuit, amplifier circuit and the like used in the receiver circuit can be adequately modified according to the specification. Further, the light-emitting element is not limited to the semiconductor laser and a light-emitting diode may be used. Likewise, as the light-receiving element, a photodiode, phototransistor or the like can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical transmitter/receiver circuit device comprising:
a transmitter circuit configured to receive a voltage signal and output a current signal, the transmitter circuit including a transition time adjusting circuit that adjusts each of transition times of a rise and fall of a first voltage signal in a preset range to acquire a second voltage signal and a voltage-current converter circuit that converts the second voltage signal to a first current signal,
a light-emitting element configured to convert the first current signal output from the transmitter circuit to an optical signal,
an optical interconnection line that transmits the optical signal,
a light-receiving element configured to convert the optical signal transmitted via the optical interconnection line to a second current signal, and
a receiver circuit configured to receive a current signal and output a voltage signal, the receiver circuit including a current-voltage converter circuit that converts the second current signal to a third voltage signal, a pulse generation circuit that generates a rise pulse in synchronism with a rise of the third voltage signal and generates a fall pulse in synchronism with a fall of the third voltage signal and a decoder circuit that generates a fourth voltage signal that rises in synchronism with the rise pulse and falls in synchronism with the fall pulse.

2. The device according to claim 1, wherein the transition time adjusting circuit includes a first differential amplifier circuit that acquires a non-inverted output signal based on a first non-inverted input signal and first inverted input signal and a second differential amplifier circuit that acquires a inverted output signal based on a second inverted input signal and second non-inverted input signal, the non-inverted output signal of the first differential amplifier circuit is positively fed back to an input terminal of the second non-inverted input signal of the second differential amplifier circuit and the inverted output signal of the second differential amplifier circuit is positively fed back to an input terminal of the first inverted input signal of the first differential amplifier circuit.

3. The device according to claim 1, wherein the transition time adjusting circuit adjusts a transition time to set a through rate of an input signal of the receiver circuit to a through rate permissible in the receiver circuit.

4. The device according to claim 2, wherein the voltage-current converter circuit is configured by a third differential amplifier circuit, the non-inverted output signal of the first differential amplifier circuit is supplied to a non-inverted input terminal of the third differential amplifier circuit and the inverted output signal of the second differential amplifier circuit is supplied to an inverted input terminal of the third differential amplifier circuit.

5. The device according to claim 1, wherein the current-voltage converter circuit includes a grounded gate amplifier circuit (trans impedance amplifier).

6. The device according to claim 1, wherein the pulse generation circuit is configured by a differentiating circuit including capacitor element C and resistor element R.

7. The device according to claim 1, wherein the decoder circuit includes a first differential amplifier circuit that acquires a non-inverted output signal based on a first non-inverted input signal and first inverted input signal and a second differential amplifier circuit that acquires a inverted output signal based on a second inverted input signal and second non-inverted input signal, the non-inverted output signal of the first differential amplifier circuit is positively fed back to an input terminal of the second non-inverted input signal of the second differential amplifier circuit and the inverted output signal of the second differential amplifier circuit is positively fed back to an input terminal of the first inverted input signal of the first differential amplifier circuit.

8. An optical transmitter/receiver circuit device comprising:
a transmitter circuit configured to receive a voltage signal and output a current signal, the transmitter circuit including a transition time adjusting circuit that adjusts each of transition times of a rise and fall of a first voltage signal in a preset range to acquire a second voltage signal and a voltage-current converter circuit that converts the second voltage signal to a first current signal,
a light-emitting element configured to convert the first current signal output from the transmitter circuit to an optical signal,
an optical interconnection line that transmits the optical signal,
a light-receiving element configured to convert the optical signal transmitted via the optical interconnection line to a second current signal, and
a receiver circuit configured to receive a current signal and output a voltage signal, the receiver circuit including a current-voltage converter circuit that converts the second current signal to a third voltage signal, an amplifier circuit that amplifies the third voltage signal and outputs a fourth voltage signal, a pulse generation circuit that generates a rise pulse in synchronism with a rise of the fourth voltage signal and generates a fall pulse in synchronism with a fall of the fourth voltage signal and a decoder circuit that generates a fifth voltage signal that rises in synchronism with the rise pulse and falls in synchronism with the fall pulse.

9. The device according to claim 8, wherein the transition time adjusting circuit includes a first differential amplifier circuit that acquires a non-inverted output signal based on a first non-inverted input signal and first inverted input signal and a second differential amplifier circuit that acquires a inverted output signal based on a second inverted input signal and second non-inverted input signal, the non-inverted output signal of the first differential amplifier circuit is positively fed back to an input terminal of the second non-inverted input signal of the second differential amplifier circuit and the inverted output signal of the second differential amplifier circuit is positively fed back to an input terminal of the first inverted input signal of the first differential amplifier circuit.

10. The device according to claim 8, wherein the transition time adjusting circuit adjusts a transition time to set a through rate of an input signal of the receiver circuit to a through rate permissible in the receiver circuit.

11. The device according to claim 9, wherein the voltage-current converter circuit is configured by a third differential amplifier circuit, the non-inverted output signal of the first differential amplifier circuit is supplied to a non-inverted input terminal of the third differential amplifier circuit and the inverted output signal of the second differential amplifier circuit is supplied to an inverted input terminal of the third differential amplifier circuit.

12. The device according to claim 8, wherein the current-voltage converter circuit includes a grounded gate amplifier circuit (trans impedance amplifier).

13. The device according to claim 8, wherein the pulse generation circuit is configured by a differentiating circuit including capacitor element C and resistor element R.

14. The device according to claim 8, wherein the decoder circuit includes a first differential amplifier circuit that acquires a non-inverted output signal based on a first non-inverted input signal and first inverted input signal and a second differential amplifier circuit that acquires a inverted output signal based on a second inverted input signal and second non-inverted input signal, the non-inverted output signal of the first differential amplifier circuit is positively fed back to an input terminal of the second non-inverted input signal of the second differential amplifier circuit and the inverted output signal of the second differential amplifier circuit is positively fed back to an input terminal of the first inverted input signal of the first differential amplifier circuit.

15. A receiver circuit comprising:
a current-voltage converter circuit configured to convert a current signal to a voltage signal,
a transition time adjusting circuit configured to adjust each of transition times of a rise and fall of the voltage signal converted by the current-voltage converter circuit in a preset range,
a pulse generation circuit configured to generate a rise pulse in synchronism with a rise of the voltage signal whose transition time is adjusted by the transition time adjusting circuit and generate a fall pulse in synchronism with a fall of the voltage signal whose transition time is adjusted by the transition time adjusting circuit, and
a decoder circuit configured to generate a voltage signal that rises in synchronism with the rise pulse and falls in synchronism with the fall pulse.

16. The circuit according to claim 15, wherein the current-voltage converter circuit is supplied with a detection signal of a light-receiving element that converts an optical signal to a current signal.

17. The circuit according to claim 15, further comprising:
a transmitter circuit configured to convert a voltage signal to a current signal and output the thus converted signal,
a light-emitting element configured to convert the current signal output from the transmitter circuit to an optical signal,
an optical interconnection line that transmits the optical signal, and
a light-receiving element configured to convert the optical signal transmitted via the optical interconnection line to a current signal,
wherein the current-voltage converter circuit is supplied with an output signal of the light-receiving element.

\* \* \* \* \*